Sept. 2, 1930.  R. C. COBEL  1,774,871
APPARATUS FOR MAKING ARTICLES OF GLASSWARE
Filed April 17, 1928
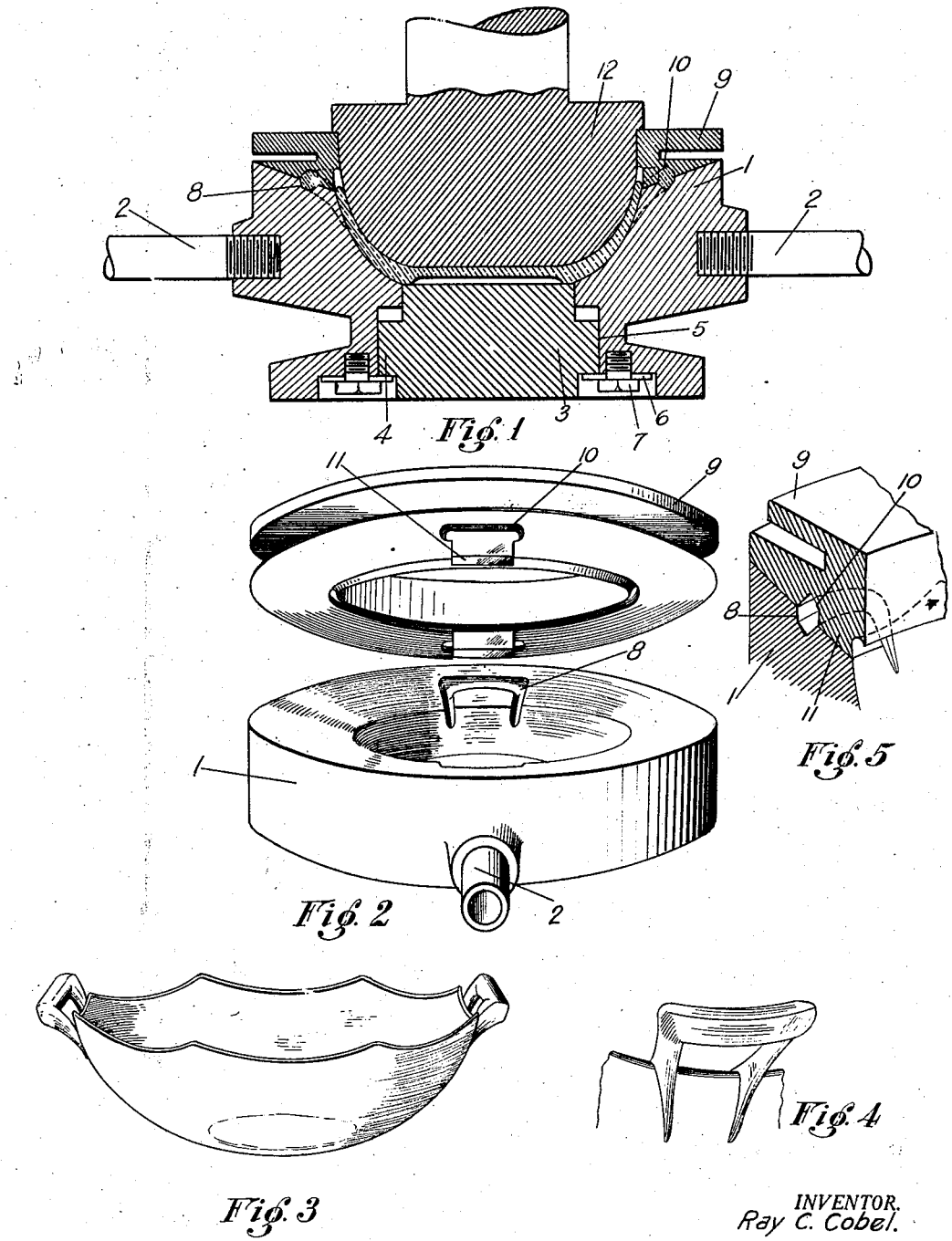
INVENTOR.
Ray C. Cobel.

Patented Sept. 2, 1930

1,774,871

UNITED STATES PATENT OFFICE

RAY C. COBEL, OF NEWARK, OHIO, ASSIGNOR TO A. H. HEISEY & COMPANY, OF NEWARK, OHIO, A PARTNERSHIP

APPARATUS FOR MAKING ARTICLES OF GLASSWARE

Application filed April 17, 1928. Serial No. 270,754.

My invention relates to method and apparatus for making articles of glassware and, more particularly, to method and apparatus for making articles of glassware, such as dishes or the like, that are provided with suitable handles.

Heretofore, it has been customary to make handled glassware, such as dishes or the like, by forming the article by any of the well-known methods, for instance pressing, and then attaching and shaping the handle by hand.

The attachment of handles to glass articles by the hand method is a slow, laborious and, consequently, expensive operation, requiring workmen of a high degree of skill. In addition to this, such method has practically precluded the idea of making glassware having handles thereon of such shape and designs as to add materially to the ornamental effect of the ware.

Making handled glassware, such as dishes or the like, by forming the body portion and then attaching and shaping the handle has had the added disadvantage which results from attaching two pieces of glass together when such pieces of glass are at different temperatures. A perfect weld is seldom, if ever, formed between the pieces of glass under such conditions and, in glassware having handles thereon, this has increased the possibility of the handles breaking away from the body portion of the article.

One object of my invention is to provide a method and apparatus for making glassware, such as dishes or the like, having handles thereon whereby the handles are formed integrally and simultaneously with the body of the article.

Other objects of my invention may be seen in the following description, and the preferred embodiment of my invention may be seen in the accompanying drawings wherein similar characters of reference designate corresponding parts and wherein:

Figure 1 is a vertical sectional view of a mold and plunger constructed in accordance with my invention.

Figure 2 is a perspective view of a part of the main body portion of the mold and the mold ring which I employ, these parts being shown separated.

Figure 3 is a perspective view of a finished article that has been formed in my mold.

Figure 4 is a perspective view of a part of the article shown in Figure 3.

Figure 5 is a perspective view, partly in section, of a portion of the main body portion of my mold showing a mold ring assembled therewith.

Referring to the drawings, I have shown a press mold of the block type comprising a main body portion 1. This main body portion 1 is preferably provided with suitable handles 2 for convenience in moving the mold from place to place and for other reasons which will hereinafter appear.

Disposed in the lower part of the main body portion 1 is a valve 3, which valve preferably forms a substantial part of the bottom of the mold. Such valve has an annular flange 4 thereon fitting within a cutaway portion 5 in the base of the main body portion of the mold. The valve may be entirely removed from the main body portion 1 by removing the annular plate 6 which is secured to the main body portion by the screw bolts 7 or other suitable means and forms the lower wall of the annular groove 5. As will be seen by referring to Figure 1, the valve 3 is ordinarily in its lowermost position.

Referring to Figures 1, 2 and 3, it will be seen that the upper part of the main body portion 1 is provided with indentations 8 on its inner surface which are of the same general contour as the underside of the handle of the article which is to be formed in the mold. A mold ring 9 that is adapted to fit upon the top of the main body portion of the mold has indentations 10 in the surface thereof which are complemental to the indentations 8 in the main body portion when the two are in assembled relation. Lugs 11, depending from the mold ring 9, are designed to rest upon the inner surface of the main body portion adjacent the indentations 8. When in this position, they are complemental to the indentations 8 and 10.

In the operation of my device, a charge of molten glass is placed in the main body portion 1 of the mold and the mold ring 9 is positioned on the mold. When the mold ring 9 is in cooperative relation with the main body portion 1 of the mold, the indentations 8 and 10, together with the lugs 11, form a handle-shaping cavity into which glass is to be forced by the action of the plunger.

With the parts in this position, a plunger 12 is placed in the main body portion of the mold in the manner shown in Figure 1 and pressure exerted thereupon. Pressure on this plunger will cause the molten glass in the main body portion of the mold to flow upwardly around the plunger to form the body of the article and into the depressions 8 and 10 to form the handle. When the molten glass has become slightly cooled and has set sufficiently, the plunger may be removed, the main body portion inverted and the valve 3 operated to push the article out of the main body portion of the mold. The article may then be subjected to the usual finishing operations, such as bending the handles to any desired angle.

Referring to the preceding description and the drawings attached hereto, it will be apparent that I have provided a method and apparatus for making articles of glassware having handles thereon wherein the handles will be formed simultaneously with the forming of the main body portion of the article and integrally therewith. Such method will not only permit the making of handled glassware wherein the handles may be of such shape and design as to add materially to the ornamental effect of the ware but will make possible the production of glassware wherein the handles have greater strength.

Having thus described my invention, what I claim is:

1. An apparatus for making an article of glassware with a handle thereon comprising a mold and a mold ring, said mold and mold ring having indentations therein designed to completely form a handle with an opening therein.

2. An apparatus for making an article of glassware with a handle thereon comprising a mold and a mold ring, said mold and mold ring having complemental indentations formed in the abutting surfaces thereof to form a handle, said abutting surfaces contacting with each other both outside of the handle and within the handle.

3. An apparatus for making articles of glassware with a handle thereon having an opening therethrough which comprises a mold and a mold ring having complemental indentations formed in the abutting surfaces thereof to form the handle with the opening therein, such abutting surfaces being free from interfitting projections.

4. An apparatus for making an article of glassware with a handle thereon comprising a mold and a mold ring, said mold and mold ring having complemental indentations formed in the abutting surfaces thereof to form a handle, each of said indentations forming substantially one-half of said handle.

5. An apparatus for making an article of glassware with a handle thereon comprising a mold and a mold ring, said mold and mold ring having complemental indentations formed in the abutting surfaces thereof to form a handle and such abutting surfaces being free from interfitting projections.

6. An apparatus for making an article of glassware with a handle thereon comprising a mold and a mold ring, said mold and mold ring having complemental indentations formed in the abutting surfaces thereof to form a handle with an opening therethrough, said indentations being of such form that the removal of the ring from the mold will leave the top and a portion of both the inner and outer sides of the handle exposed.

In testimony whereof I hereby affix my signature.

RAY C. COBEL.